United States Patent [19]

Hecker

[11] Patent Number: 4,662,400
[45] Date of Patent: May 5, 1987

[54] FLUID DISPENSING

[75] Inventor: Raymond L. Hecker, Mission Viejo, Calif.

[73] Assignee: American Hospital Supply Corporation, Evanston, Ill.

[21] Appl. No.: 666,203

[22] Filed: Oct. 29, 1984

[51] Int. Cl.$^4$ .............................................. F16K 31/10
[52] U.S. Cl. .............................. 137/625.18; 137/595; 251/186; 251/325
[58] Field of Search ................... 137/594, 595, 625.18; 251/318, 322, 368, 186, 325

[56] References Cited

U.S. PATENT DOCUMENTS

| | | | |
|---|---|---|---|
| 1,117,070 | 11/1914 | Longan | 251/186 |
| 2,792,019 | 5/1957 | Lieser | 251/186 |
| 3,386,461 | 6/1968 | Fisher | 137/595 |
| 3,451,651 | 6/1969 | Rood | 251/322 |
| 3,642,020 | 2/1972 | Payne | 251/186 |
| 3,776,276 | 12/1973 | Stiltner | 137/625.18 |
| 4,053,283 | 10/1977 | Schneider et al. | 251/325 |
| 4,420,142 | 12/1983 | Dworak et al. | 251/368 |
| 4,493,476 | 1/1985 | Strickland et al. | 137/625.18 |
| 4,535,808 | 8/1985 | Johanson et al. | 251/368 |

Primary Examiner—Martin P. Schwadron
Assistant Examiner—Sheri M. Novack
Attorney, Agent, or Firm—Perman & Green

[57] ABSTRACT

For precision dispensing of fluids particularly for medical applications, a face valve has a valve member mounted for linear sliding movement across the face of a valve body, which has fluid passages therethrough, between positions in which respectively the valve member seals the ends of the fluid passages at the valve body face and a channel in the valve member connects the ends of the fluid passages. The valve body is of a hard corrosion resistant metal and the valve member is of bearing plastic material, both materials being inert to the fluids being dispensed. The valve is pressed against the face of the valve body by a spring which is oriented in a particular way to optimize valve life.

21 Claims, 6 Drawing Figures

FLUID DISPENSING

BACKGROUND OF THE INVENTION

This invention relates to the precision dispensing of fluids, and more particularly to a face valve for use in the precision dispensing of fluids, such as for medical applications wherein precision, inert valving is required to control movement of fluids. For example, it may be used for dispensing fluids in an automatic medical analyzer such as diluents, liquid reagents, biological samples, etc.

Prior art valves for controlling the dispensing of fluid in medical applications have traditionally been of the type having a sliding, rotary motion. The so-called face valve with which the present invention is concerned has a valve member mounted for linear sliding movement across a face of the valve body. At least one pair of fluid passages extend through the valve body and terminate in open ends at its face. The valve member is movable between a first position in which the fluid passages are closed and a second position in which the fluid passages are interconnected by a channel in the valve member. A compression spring presses the valve member against the face of the valve body to maintain a tight seal.

Precision dispensing valves of this kind suitable for medical applications have been found to have an upredictable life. Particularly for medical applications, it is important that the materials used for the valve be inert to the fluids being dispensed. One proposed face valve for such application has utilized a graphite valve member acting on a ceramic valve body. The wear characteristics of this previous valve, however, were found to be unsatisfactory.

It is a purpose of this invention to provide an improved face valve for precision dispensing of fluids.

Further purposes include providing such a face valve which has a predictable life and improved wear characteristics.

SUMMARY OF THE INVENTION

It has been found that the orientation of the spring used to press the valve member against the face of the valve body to effect the fluid seal affects wear rate and thus the life of the valve and that the spring, if placed in the valve assembly in a random fashion, gives the valve an unpredictable life. In accordance with one aspect of the present invention, the spring is oriented in a way in which the life of the valve is predictable and optimized. To this end the helical compression spring is aligned with respect to the valve member such that its end pressing on the valve member terminates on a line extending radially of the spring normally to the direction of linear sliding movement of the valve member. The spring is preferably conical and has the surface thereof engaging the valve member ground flat, preferably over a portion extending through 270 degrees of revolution of the spring from said end of the spring. In another embodiment, the spring can also be a wave spring.

It has also been found that the choice of materials for the valve member and valve body are important. Thus, improved valve life can be achieved in accordance with another aspect of the invention by making the valve body of a hard corrosion resistant metal and the valve member of bearing plastics material such materials are both inert to the fluids to be dispensed through the valve. Suitably, the valve member is made of BP40-type materials (polyethylene sulfide with graphite reinforced fiber) or a Ryton polymer, while the valve body is of stainless steel, preferably heat-treated and of grade 17-4PH.

In order to reduce leakage to a minimum and thus allow a high degree of precision in dispensing, the mating surfaces of the valve body and valve member should have a good surface finish. Thus, these surfaces preferably have a flatness of from about 1 to about 10 microinches with the flatness deviating by less than about 3 wavelengths of red light. Further, the surfaces should be firmly pressed together, preferably at a pressure of at least about 30 pounds per square inch.

In a preferred embodiment, the valve member comprises a circular button mounted in a linear slide member. The button has a rearwardly extending guide post for the helical compression spring, the post having an alignment groove which engages with a key on the slide member to constrain the button against rotation. The button has a fillet along its upper side defining a raised strip-like bearing surface portion engaging the valve body face. The strip is aligned with the direction of linear sliding movement of the button. The channel in the button for interconnecting the fluid passages in the valve body suitably takes the form of a groove in the bearing surface of the valve member.

A valve of this invention may have one entry passage and one exit passage with the valve member movable between respective positions in which the passages are sealed and interconnected. It may also have plural pairs of entry and exit passages with the valve member movable to interconnect the pairs of passages one at a time. Thus, in one preferred form, the valve body has two pairs of passages and the valve member is movable between a first and a second position. At the first position, one pair of passages is interconnected by the channel therein while the open ends of the other pair of passages are sealed thereby. At the second position, the other pair of passages is interconnected and the one pair is sealed. In a third; e.g., intermediate, position, the ends of both pairs of passages are sealed by the valve member.

A valve in accordance with the present invention is particularly adapted for use in medical applications such as for dispensing fluids which may be diluents, liquid reagents, biological samples, etc., in an automatic medical analyzer.

Thus, the present invention also provides a fluid dispenser for precision dispensing of fluids including at least one fluid delivery line and a face valve as described above connected in the delivery line for controlling dispensing of fluids through the line. For such application, the slide member as described above is suitably connected to a displacement mechanism for automatic actuation of the valve.

The valve of the present invention may in particular be utilized in a clinical analysis system as described and illustrated in commonly owned U.S. patent application Ser. No. 575,924, filed Feb. 1, 1984, entitled "Clinical Analysis Systems and Methods", the disclosure of which is hereby incorporated by reference in its entirety herein. The valve may be utilized for controlling the dispensing of any of the fluids handled in such system.

DESCRIPTION OF THE DRAWINGS

Other features and advantages of the present invention will become apparent from the following description taken in conjunction with the accompanying drawings wherein.

DETAILED DESCRIPTION

Figure 1:
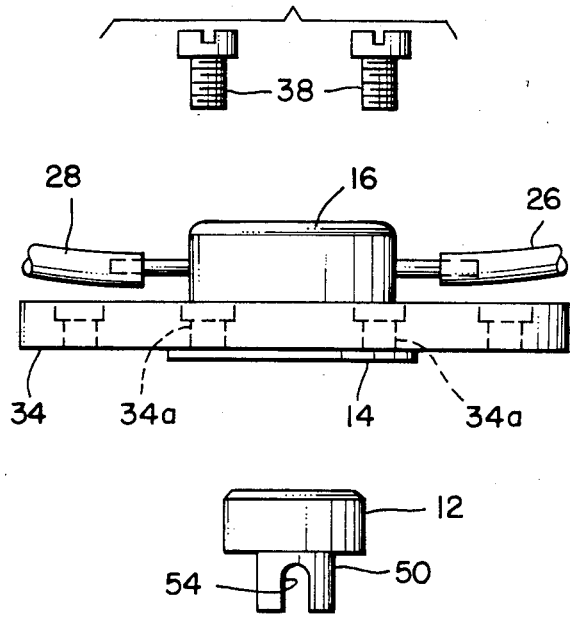
FIG. 1 is an exploded side elevational view of an embodiment of the face valve according to the present invention.

Referring to the drawings, there is illustrated a slide valve 10 according to the invention for controlling the dispensing of fluids. The valve 10 is of the type commonly called a face valve in which a valve member 12 is mounted for sliding movement across a face 14 of a valve body 16. The valve body 16 has fluid passages 18, 20 therethrough which terminate in open ends in the face 14. The valve member 12 has a channel 22 therein for interconnecting the fluid passages 18, 20. The valve member 12 is movable between positions in which the fluid passages in the valve body 16 are respectively interconnected by the channel 22 and sealed by the valve member. The valve member 12 is pressed against the valve face 14 by a spring 24.

Figure 5:
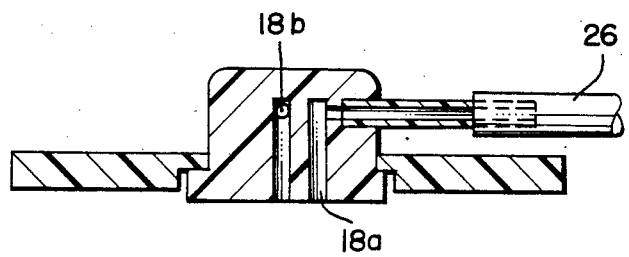
FIG. 5 is a section along the line 5—5 of FIG. 6 through the valve body.
Figure 6:
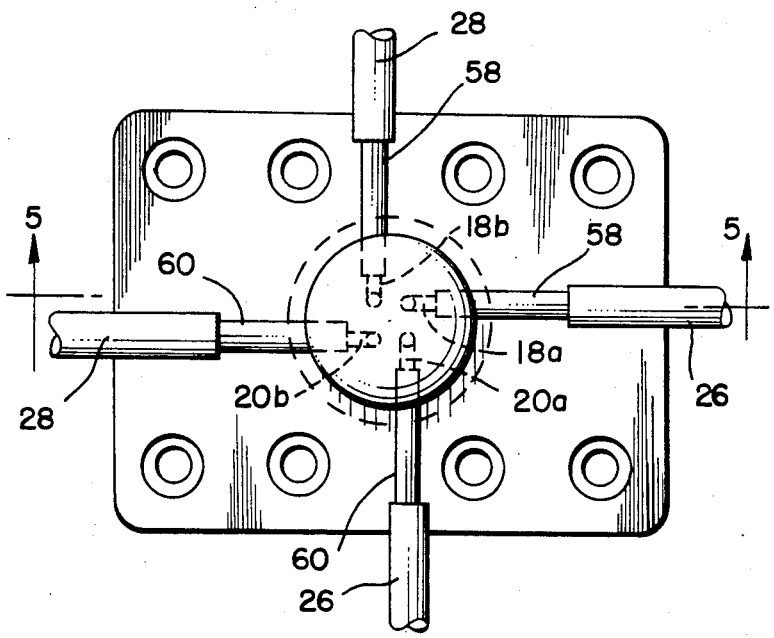
FIG. 6 is a top plan view showing the front of the valve body.

The valve 10 illustrated is designed for a fluid dispensing system which dispenses fluids through two delivery lines 26, 28 (by which the system is schematically represented in FIG. 5) and includes two input or entry passages 18a, 18b and two output or exit passages 20a, 20b. Thus, as shown in FIG. 5, one pair of input/output passages 18a, 20a is connected in delivery line 26 and the other pair of input/output passages 18b, 20b is connected in delivery line 28.

As described in detail below, the valve member 12 is slideable between positions in which it (a) interconnects fluid passages 18a, 20a while sealing the open ends of fluid passages 18b, 20b and (b) interconnects fluid passages 18b, 20b while sealing the open ends of the fluid passages 18b, 20b. Such a valve may be termed a four-way, two position directional control valve with sliding member. In a preferred form the valve member has a third position intermediate the above-described operative positions in which it seals the open ends of all four fluid passages 18, 20.

The valve is of the linear slide type and the valve member 12 is mounted for sliding movement across the face 14 of the valve body 16 in a linear slide member 30. The slide member 30 is itself slideably mounted in a U-shaped yoke or frame 32 which is rigidly connected to the valve body 16. This is achieved by clamping together an annular flange plate 34, in which the valve body 16 is mounted, and lips 36 on the yoke 32 using four screws 38 which pass through openings 34a in the plate 34 into threaded openings 36a in the lips 36. In FIG. 1, only two of the screws 38 and one of the lips 36 are visible.

The slide member 30 is slideable from left-to-right in FIG. 1 and has end pieces 40, 42 which limit the movement of the slide member and define the respective operative positions of the valve member 12. Thus, when the end piece 40 is engaged against one side of the yoke 32, the fluid passages 18a, 20a are interconnected and the fluid passages 18b, 20b are sealed. When the end piece 42 is engaged against the other side of the yoke, the fluid passages 18b, 20b are interconnected and the fluid passages 18a, 20a are sealed.

The valve is non-lubricated and, in order to facilitate sliding motion of the slide member 30, it is carried on roller bearings 44 arranged in a bearing spacer 46 mounted between the slide member 30 and the yoke 32.

The valve member 12 is in the form of a circular button and seats in a cage or circular recess 48 in the slide member 30. The spring 24 is a helical compression spring mounted in the cage 48 and pressing against the back or underside of the button 12. The spring 24 in this embodiment is preferably conical as shown for maximum effect in the small space.

It is located at its larger end in the cage 48 and at its smaller end by a port 50 which extends rearwardly from the button 12 into an opening 52 in the base of the recess 48. The button 12 is constrained against rotation relative to the valve face 14 by an alignment groove 54 in the end of the post 50 engaging a key 56 in the opening 52.

The spring 24 can also be a wave spring which can improve performance. The wave spring when used to replace the conical spring serves the same bias function but can provide better stability.

The button 12 has a strip-like portion or fillet defining a strip-like bearing surface 12a extending in the direction of linear movement of the button which mates with the face 14 of the valve body. The valve member 16 is circular and also has a raised fillet extending in the direction of linear movement of the button 12 which defines the face 14. The channel 22 in the surface 12a of button 12 is in the form of a slot-like groove extending across the surface 12a at right angles to the direction of linear movement of the button.

The open ends of the fluid passages 18, 20 are spaced over the face 14 with the pairs of passages spaced along the face 14 and the passages in each pair arranged across the face 14 at right angles to the direction of linear movement of the button. In one end position of the slide member 30, the channel 22 overlies the open ends of passages 18a and 20a. In its other end position, the channel 22 overlies and interconnects the open ends of passages 18b and 20b. In an intermediate position, the channel 22 is located between the pairs of fluid passages and all four passages are sealed.

Figure 2:
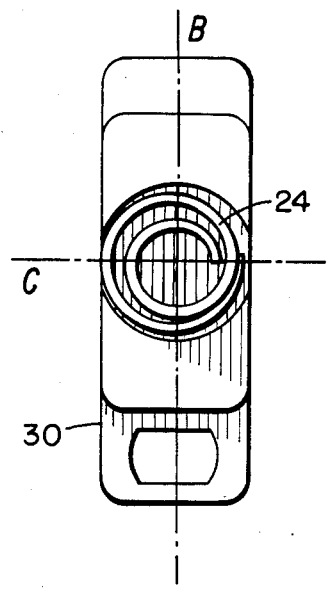
FIG. 2 is a view taken along the line 2—2 of FIG. 1 showing the orientation of the spring.
Figure 3:
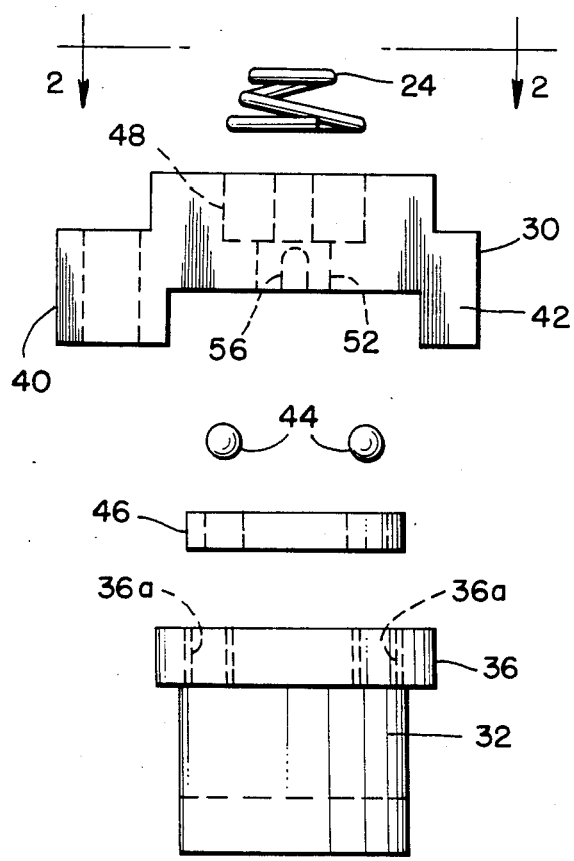
FIG. 3 is a top plan view showing the front of the valve member.
Figure 3:
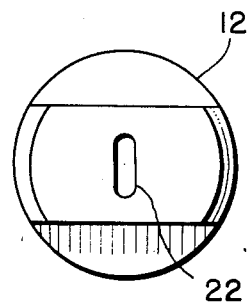
Figure 4:
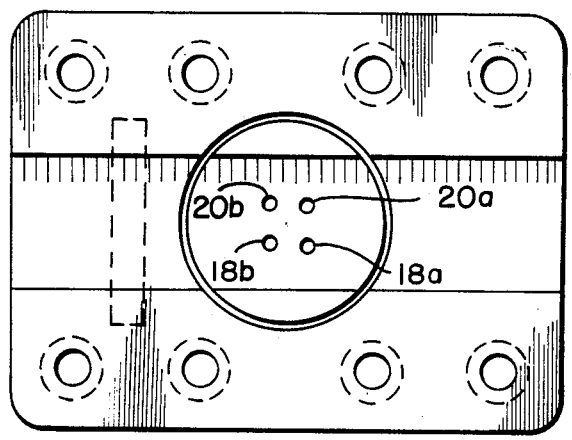
FIG. 4 is a bottom plan view showing the rear of the valve body.

It has been found that by orienting the conical spring 24 in a particular way, the life of the valve can be predictable and optimized. To this end the spring 24 is arranged as shown in FIG. 2. It is aligned with respect to the valve member or button 12 such that its end pressing against the valve member terminates on a reference line C. Reference line C extends radially of the spring normally to the direction of linear sliding movement of the valve member 12. Furthermore, it is preferable that the surface of the spring 24 engaging the back of the valve button 12 be flat. This is achieved in the embodiment shown by grinding the upper surface of the spring flat over 270 degrees of revolution between axis C and axis B along which the valve member moves. The spring is suitably made of high tensile strength material, the preferred material being heat treatable stainless steel.

It has also been found that the choice of materials for the valve member 12 and the valve body 16 are important in relation to the operation and life of the valve. To this end, the valve member 12 is made of bearing plastic material and the valve body is made of a hard, corrosion-resistant metal. Both materials should be inert to the fluids being dispensed through the valve. Suitable materials for the valve member 12 are BP40 materials (polyphenylene sulfide with graphite reinforced fiber), which can be obtained from Balseal Corporation of Santa Ana, Calif., 92707 and Ryton polymers obtainable from Phillips Chemical Co., Division of Phillips Petroleum Co., Bartesville, Okla. 74004.

The valve body 16 is suitably made of stainless steel such as a proprietary grade of stainless steel made by Armco Stainless Steel Division, Middletown, Ohio 45043 and designated 17-4PH, which is heat treated.

In the embodiment illustrated, the slide member 30 is made of epoxy, mineral glass-filled, and the yoke 32 is made of aluminum alloy while the flange plate 34 in which the valve body 16 is mounted is made of aluminum alloy and the valve body is secured to it by epoxy.

In a particular embodiment, the valve body 16 is 0.562 inch in diameter and the valve button 12 has a diameter of 0.496 while the passages 18, 20 have a bore of 0.033 inch.

The surface pressure of the button 12 against the valve face 14 and the flatness of the mating surfaces should be sufficient to form a tight seal at the fluid pressures involved. It has been found that the surface pressure of the button 12 against the valve body 16 should preferably be at least about 30 psi. The surface finish of the mating surfaces 14, 12a should preferably be from about 1 to about 10 microinches flatness and should not deviate by more than 3 wavelengths of red light. To achieve the necessary flatness, the top surface 12a of the button 12 and the face 16 are given a final lap using 3 micron aluminum oxide imperial lapping film (available from 3M Company of St. Paul, Minn.) to a reference flatness between 0.1 and 0.5 wavelengths of the optical light source and cleaned in acetone in an ultrasonic fixture to prevent damage to the lapped surfaces.

The valve described and illustrated herein is designed to be an essentially leak free valve and under normal operation there is no weeping of the fluid. Valves are less prone to leakage at higher positive fluid pressures. Sealing is much more difficult at low fluid pressures and extremely difficult at zero or negative fluid pressures. The normal fluid pressure in a typical fluid dispenser in which the valve may be utilized is about 15 psi, although clogs, material crystalization and other conditions raise this pressure.

The valve has a built-in pressure relief when a constant pressure is applied to the button. However, sufficient pressure can build up before "blow-by" occurs and the fluid is relieved. There is a designed overload protection at 125 psi before the relief function is activated. Essentially leak free is defined in terms of precision dispensing. For instance, this valve permits 2 to 20 microliters of fluid to be dispensed per operation with a precision of 1½%. This is considered essentially leak free in this embodiment.

The passages 18, 20 extend part of the way through the valve body 16 at right angles to the face 14. They are respectively connected to tubes 58, 60 which extend out of the valve body and form fixtures to receive the adjacent ends of the delivery pipes 26, 28. The positions of the delivery pipes connected to the output passages 20 terminate in suitable outlets for the fluids while the other ends of the delivery pipes are connected to suitable fluid containers (not shown). The valve itself is operated automatically by a suitable displacement mechanism, such as an eccentric crank connected to the slide member 30, preferably under microprocessor control.

One or more fluid dispensers schematically illustrated herein may be incorporated in a medical analyzer for the automatic dispensing of diluents, liquid reagents, biological samples, etc. In particular such dispensers may be incorporated in an automated single track clinical analyzer as described in aforesaid copending U.S. patent application Ser. No. 575,924 incorporated by reference herein.

It should be understood that the above-described embodiments of the invention are illustrative only and that modifications thereof may occur to those skilled in the art. Accordingly, this invention is not to be regarded as limited to the embodiments disclosed herein, but is to be limited only as defined by the appended claims.

I claim:

1. A face valve comprising:
   (a) a corrosion resistant metal valve body having a flat face and at least two fluid passages extending therethrough to terminate in ends arranged side-by-side at said flat face;
   (b) a bearing plastics valve member having a flat face and a channel formed in said flat face;
   (c) means pressing said face of said valve member against said face of said valve body, the pressure applied and the flatness of said mating faces of said valve member and said valve body being such that said faces form an essentially leak-free seal; and
   (d) means mounting said valve member for linear sliding movement across said face of said valve body between a first position in which said channel in said face of said valve member is out of alignment with said ends of said fluid passages and said ends of said fluid passages are closed by said face of said valve member and a second position in which said channel is aligned with said ends of said fluid passages and interconnects said fluid passages across said face of said valve member.

2. A face valve as in claim 1 in which said valve body is of stainless steel and the valve member is of a material selected from polyphenylene sulfide with graphite reinforced fiber and a Ryton polymer.

3. A face valve as in claim 2 in which said stainless steel is heat treated and of grade 17-4PH.

4. A face valve as in claim 2 in which the mating faces of the valve body and valve member has a flatness of from about 1 to about 10 microinches.

5. A face valve as in claim 4 in which the flatness deviates by less than about 3 wavelengths of red light.

6. A face valve as in claim 1 including spring means pressing said valve member against said face of said valve body at a pressure of at least about 30 pounds per square inch.

7. A face valve as in claim 2 including a helical compression spring pressing said valve member against said face of said valve body, said helical compression spring being aligned with respect to said valve member such that its end pressing on the valve member terminates at a line extending through the axis of the spring normally to said linear direction of movement of the valve member.

8. A face valve as in claim 7 in which said spring is conical and tapers towards said valve member.

9. A face valve as in claim 8 in which the surface of the spring engaging the valve member is ground flat.

10. A face valve as in claim 8 in which the surface of the spring facing the valve member is ground flat over a portion extending through 270 degrees of revolution of the spring from said end of the spring.

11. A face valve as in claim 2 in which said valve member comprises a circular button mounted in a linear slide member and constrained against rotation.

12. A face valve comprising:
 (a) a corrosion resistant metal valve body having a face and at least two fluid passages extending therethrough to terminate at said face;
 (b) a bearing plastics valve member having a channel therein;
 (c) means mounting said valve member for linear sliding movement across said face of said valve body between a first position in which said fluid passages are closed by said valve member and a second position in which said channel interconnects said fluid passages; and
 (d) a helical compression spring pressing said valve member against said face of said valve body, said helical compression spring being aligned with respect to said valve member such that its end pressing on the valve member terminates at a line extending through the axis of the spring normally to said linear direction of movement of the valve member, said valve member comprising a circular button mounted in a linear slide member, said circular button having a rearwardly extending guide post for said spring, said post having an alignment groove which engages with a key on said slide member to constrain said button against rotation.

13. A face valve comprising:
 (a) a valve body having a flat face and at least two fluid passages extending therethrough to terminate in ends arranged side-by-side at said flat face;
 (b) a valve member having a flat face and a channel formed in said flat face;
 (c) a helical compression spring pressing said face of said valve member against said face of said valve body to form an essentially leak-free seal therebetween; and
 (d) means mounting said valve member for linear sliding movement of said face thereof across said face of said valve body between a first position in which said channel in said face of said valve member is out of alignment with said ends of said fluid passages and said ends of said fluid passages are closed by said face of said valve member and a second position in which said channel is aligned with said ends of said fluid passages and interconnects said fluid passages across said face of said valve member, said helical compression spring being aligned with respect to said valve member such that its end pressing on the valve member terminates at a line extending through the axis of the spring normally to said direction of linear movement of said valve member.

14. A face valve as in claim 13 in which said spring is a conical spring tapering towards said valve member.

15. A face valve as in claim 13 in which the surface of the spring engaging the valve member is flat.

16. A face valve as in claim 14 in which the surface of the spring facing the valve member is ground flat over a portion extending through 270 degrees of revolution of the spring from said end of the spring.

17. A face valve as in claim 13 in which said spring presses said valve member against said face of said valve body at a pressure of at least about 30 pounds per square inch.

18. A face valve as in claim 13 in which said valve member comprises a circular button mounted in a linear slide member with the spring positioned between said button and said slid member, said button being constrained against rotation.

19. A face valve comprising:
 (a) a valve body having a face and at least two fluid passages extending therethrough to terminate at said face;
 (b) a valve member having a channel therein;
 (c) a helical compression spring pressing said valve member against said face; and
 (d) means mounting said valve member for linear sliding movement across said face of said valve body between a first position in which said fluid passages are closed and a second position in which said channel interconnects said fluid passages, said helical compression spring being aligned with respect to said valve member such that its end pressing on the valve member terminates at a line extending through the axis of the spring normally to said direction of linear movement of said valve member,
said valve member comprising a circular button mounted in a linear slide member with the spring positioned between said button and said slide member, said button being constrained against rotation, and said circular button having a rearwardly extending guide post, said spring surrounding said guide post and said post having an alignment groove engaged with a key on said slide member to constrain said button against rotation.

20. A face valve comprising:
 (a) a corrosion resistant metal valve body having a flat face and at least two fluid passages extending therethrough to terminate in ends arranged side-by-side at said flat face;
 (b) a bearing plastics valve member having a flat face and a channel formed in said flat face;
 (c) means pressing said face of said valve member against said face of said valve body, the pressure applied and the flatness of said mating faces of said valve member and said valve body being such that said faces form an essentially leak-free seal; and
 (d) means mounting said valve member for linear sliding movement across said face of said valve body between a first position in which said channel in said face of said valve member is out of alignment with said ends of said fluid passages and said ends of said fluid passages are closed by said face of said valve member and a second position in which said channel is aligned with said ends of said fluid passages and interconnects said fluid passages across said face of said valve member,
said face valve having two pairs of said fluid passages extending therethrough to terminate at said face, said valve member being movable between a first position in which one pair of said passages is interconnected by said channel in the valve member and the other pair of passages is closed by the valve member, and a second position in which the other pair of passages is interconnected by said channel and said one pair of passages is closed by said valve member.

21. A fluid dispenser for precision dispensing of fluids from a fluid container including at least one fluid delivery line for delivering fluid from the container and a face valve connected in said line, said valve comprising:
   (a) a valve body of a corrosion resistant metal inert to said fluids and having a flat face and two fluid passages respectively connected to upstream and downstream portions of said fluid delivery line, both said passages extending through said valve body to terminate in ends arranged side-by-side at said flat face;
   (b) a valve member of bearing plastics material inert to said fluids and having a flat face and a channel formed in said flat face;
   (c) a helical compression spring pressing said flat face of said valve member against said flat face of said valve body; and
   (d) a slide member for effecting linear sliding movement of said valve member across said face of said valve body between a first position in which said channel in said face of said valve member is out of alignment with said ends of said fluid passages and said ends of said fluid passages are closed by said face of said valve member to prevent dispensing of fluid through said delivery line and a second position in which said channel is aligned with said ends of said fluid passages and interconnects said fluid passages across said face of said valve member for dispensing fluid through said delivery line.

* * * * *